US008693955B2

(12) United States Patent
Pan et al.

(10) Patent No.: US 8,693,955 B2
(45) Date of Patent: Apr. 8, 2014

(54) METHOD AND APPARATUS FOR DETERMINING THE LOCATION OF A NODE IN A WIRELESS SYSTEM

(76) Inventors: Shaowei Pan, Kildeer, IL (US); Xiaohua Wu, Kildeer, IL (US)

( * ) Notice: Subject to any disclaimer, the term of this patent is extended or adjusted under 35 U.S.C. 154(b) by 278 days.

(21) Appl. No.: 12/592,490

(22) Filed: Nov. 25, 2009
(Under 37 CFR 1.47)

(65) Prior Publication Data
US 2011/0165845 A1    Jul. 7, 2011

Related U.S. Application Data

(63) Continuation-in-part of application No. 12/023,220, filed on Jan. 31, 2008, now abandoned.

(51) Int. Cl.
*H04B 17/00*    (2006.01)

(52) U.S. Cl.
USPC ....................................... 455/67.11

(58) Field of Classification Search
USPC .............. 455/11.1, 423, 41.3, 7, 456.1, 67.11
See application file for complete search history.

(56) References Cited

U.S. PATENT DOCUMENTS

| | | | | |
|---|---|---|---|---|
| 7,194,275 | B2 * | 3/2007 | Bolin et al. ................. | 455/456.6 |
| 7,233,799 | B2 * | 6/2007 | Spain, Jr. ................... | 455/456.1 |
| 2001/0039181 | A1 * | 11/2001 | Spratt ......................... | 455/11.1 |
| 2003/0148771 | A1 * | 8/2003 | de Verteuil .................. | 455/456 |
| 2004/0203717 | A1 * | 10/2004 | Wingrowicz et al. ....... | 455/423 |
| 2009/0275344 | A1 * | 11/2009 | Carlson et al. ............. | 455/456.1 |

FOREIGN PATENT DOCUMENTS

| | | |
|---|---|---|
| GB | 2 364 617 | 1/2002 |
| WO | WO 2006-044931 | 4/2006 |
| WO | WO 2006-105618 | 10/2006 |
| WO | WO 2006-105619 | 10/2006 |
| WO | WO 2008-005904 | 1/2008 |
| WO | WO 2008-097694 | 8/2008 |

OTHER PUBLICATIONS

Motorola, Inc. "Motorola Intelligent Design and Growth Planning Service for GSM Networks," Motorola Network Services and Applications Management, Motorola 2006.
Dirk Nikolai, "Mobile Positioning Solutions for GSM", Alcatel R&I, Stuttgart, Germany, Jan. 11, 2002.
Ruzzarin, et al., "CELLO—IST-200-25382-CELLO: Cellular Network Optimization Based on Mobile Location, Pre-Study Report", Information Society Technologies, MTCI, May 1, 2001.

* cited by examiner

*Primary Examiner* — April G Gonzales
(74) *Attorney, Agent, or Firm* — Garlick & Markison; Bruce E. Stuckman

(57) ABSTRACT

A method and apparatus for determining the location of a node within a wireless communication system is provided herein. In order to determine the location of a node, a series of GSM network measurement reports (NMRs) received at multiple base stations are analyzed by location-finding equipment. Multiple reports from the same mobile unit are analyzed for their received signal strength and multiple location estimates are then determined for the node. The location estimates are then averaged and weighted to determine an accurate location estimate for the node.

2 Claims, 2 Drawing Sheets

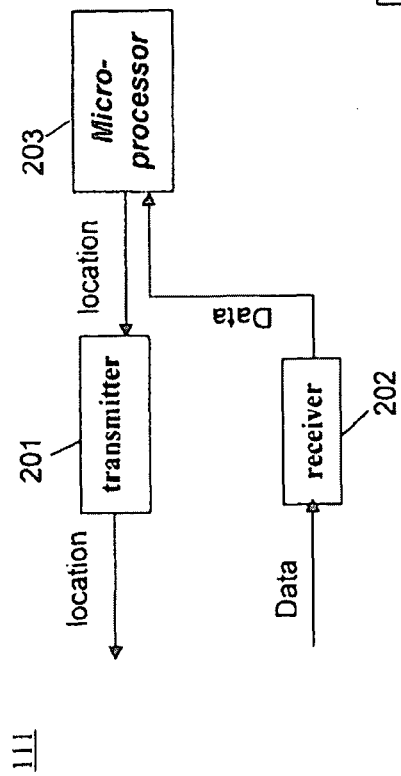
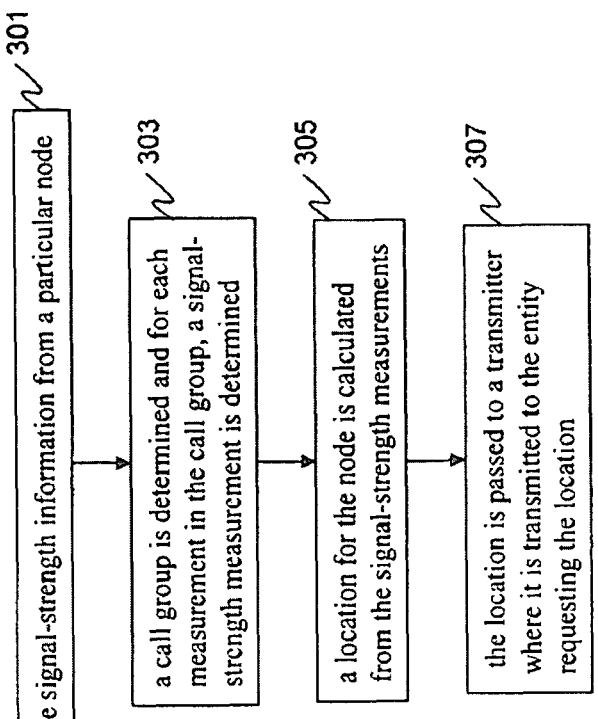

METHOD AND APPARATUS FOR DETERMINING THE LOCATION OF A NODE IN A WIRELESS SYSTEM

CROSS REFERENCE TO RELATED PATENTS/PATENT APPLICATIONS

The present U.S. Utility patent application claims priority pursuant to 35 U.S.C. §120, as a continuation-in-part (CIP), to the following U.S. Utility Patent Application:
1. U.S. Utility application Ser. No. 12/023,220, filed Jan. 31, 2008 now abandoned.

FIELD OF THE INVENTION

The present invention relates generally to radiolocation and in particular, to a method and apparatus for determining the location of a node within a wireless communication system.

BACKGROUND OF THE INVENTION

A variety of systems have been proposed that call for the ability to determine the location of an object within a wireless communication system. For example, in asset control, it is desirable to know the locations of objects (e.g., laptop computers, cell phones, . . . , etc.) within the confines of an office building. Prior-art wireless location techniques run the gamut from space-consuming, expensive circuitry that provides very accurate location estimates, to inexpensive, non-space-consuming circuitry that provides very gross location estimates. As is evident, there typically exists a tradeoff between accurate location techniques that are space-consuming and expensive to implement, and less expensive non-space consuming techniques that provide less accurate location estimates. It would be beneficial to improve on a less-expensive approach so that a more accurate determination of location can be made with very little added circuitry. Therefore a need exists for a method and apparatus for determining the location of an object within a wireless communication system that is relatively inexpensive, yet provides accurate location estimates.

BRIEF DESCRIPTION OF THE DRAWINGS

FIG. 2 is a block diagram of the location-finding equipment of FIG. 1.

FIG. 3 is a flow chart showing the operation of the location-finding equipment of FIG. 1.

DETAILED DESCRIPTION OF THE DRAWINGS

Figure 1:
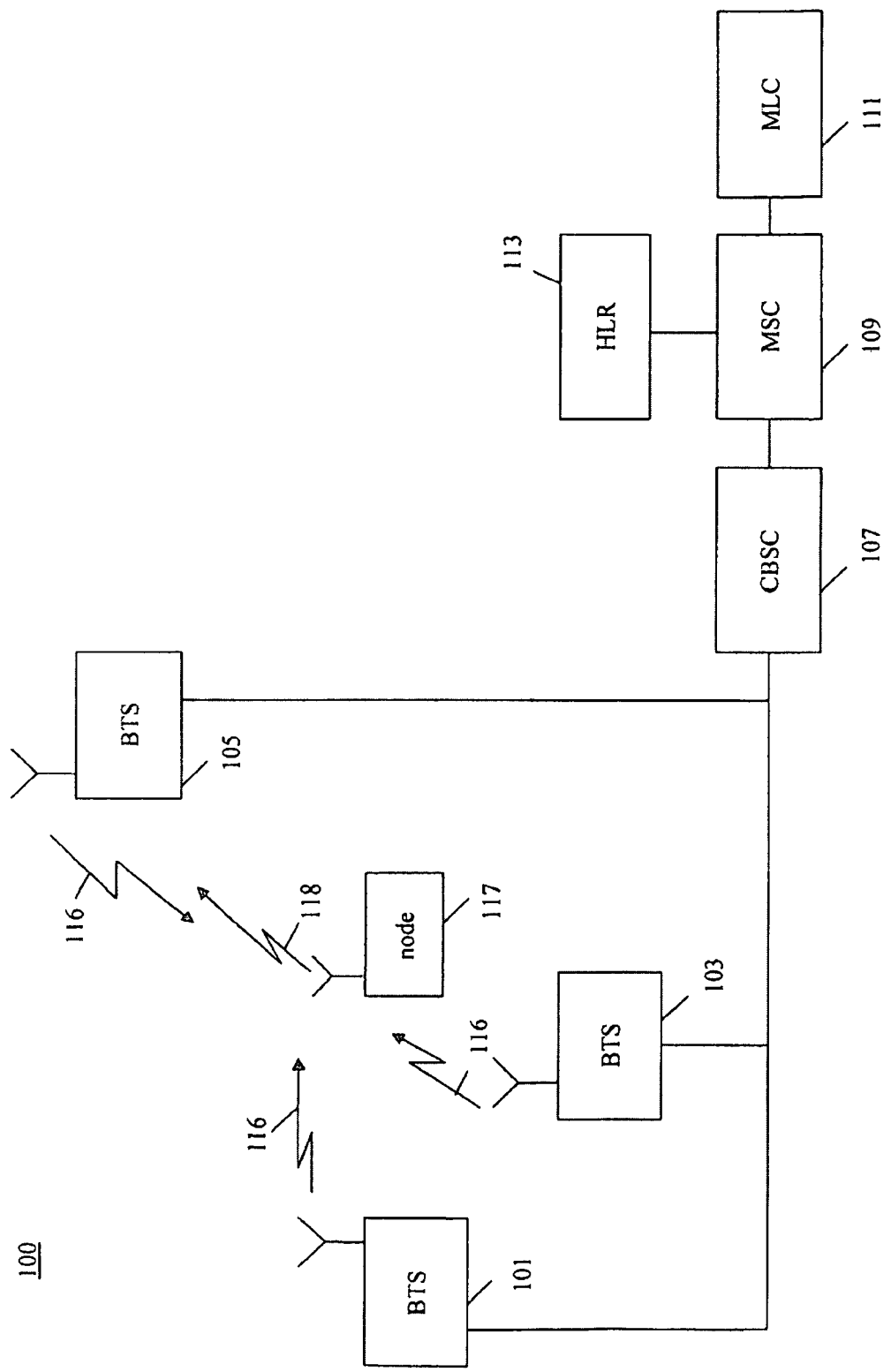
FIG. 1 is a block diagram showing a communication system.

In order to alleviate the above-mentioned need, a method and apparatus for determining the location of a node within a wireless communication system is provided herein. In order to determine the location of a node, a series of GSM network measurement reports (NMRs) received at multiple base stations are analyzed by location-finding equipment. Multiple reports from the same mobile unit are analyzed for their received signal strength and multiple location estimates are then determined for the node. The location estimates are then averaged and weighted to determine an accurate location estimate for the node.

Because all location estimates are derived directly from the GSM network measurement report, no additional signaling or hardware is needed in order to perform accurate location estimates. Thus, a relatively inexpensive location technique is provided that allows for accurate location estimates. More particularly, the information used for location is purely extracted from the information collected in NMRs for handover purpose during the normal cell phone calling. As the user moves, the call will be handed over by cell A to the cell B. An MSC will determine the handover based upon the information of the network measurement report that has been periodically (every 0.48 s) sent by the mobile station (MS) during the call. Thus, the present invention can be used as a purely post process manner utilizing existing data collected for normal cell phone calling to find the MS location.

The present invention encompasses a method for determining a location of a node. The method comprises the steps of receiving a plurality of GSM network measurement reports and determining a call group from those network measurement reports having a same identification. Signal-strength measurements are determined from the plurality of GSM network measurement reports within the call group and a location is determined from the signal-strength measurements.

The present invention additionally encompasses an apparatus for determining a location of a node. The apparatus comprises a receiver receiving a plurality of GSM network measurement reports. The apparatus additionally comprises logic circuitry determining a call group from those network measurement reports having a same identification, determining signal-strength measurements from the plurality of GSM network measurement reports within the call group, and determining a location from the signal-strength measurements.

Turning now to the drawings, where like numerals designate like components, FIG. 1 is a block diagram showing communication system 100. Communication system 100 utilizes a Global System for Mobile Communications (GSM) protocol, but in alternate embodiments communication system 100 may utilize other communication system protocols.

Communication system 100 includes Base Transceiver Stations (BTSs) 101-105, node 117, Centralized Base Station Controller (CBSC) 107, Mobile Switching Center (MSC) 109, and Mobile Location Center (MLC) 111. In the preferred embodiment of the present invention base stations 101-105 are preferably Motorola base stations, MSC 104 is preferably a Motorola MSC, and CBSC 107 is preferably comprised of a Motorola CBSC component. As shown, node 117 is receiving communication from base stations 101-105. Base stations 101-105 are suitably coupled to CBSC 107 and communicate to node 117 via downlink communication signals 116.

Operation of communication system 100 occurs as follows: To initiate a location request, a command is originated at a regional entity such as MSC 109, MLC 111, or perhaps within a connected network such as a Public Switched Telephone Network (PSTN) (not shown). The location request, which includes identification information on the remote unit that is to be located, enters HLR 113 where it is processed to determine the currently serving base station. Once the currently serving base station (e.g., base station 101) is known, the location request is passed to the appropriate base stations (e.g., neighboring base stations 103-105) and node 117. Base stations 101-105 transmit, and node 117 receives a radio frequency (RF) signal transmitted via downlink signal 116.

As part of normal GSM operations, remote unit will periodically measure the signal strength of downlink signals 116 and report this information back to the base stations via a GSM network measurement report 118. The GSM network measurement report 118 is described in detail within the GSM specification, section 3GPP TS 43.055 v5.2.0, section 5.2. As described in the GSM specification, systems measurement data are transmitted from the nodes to base stations with an interval of 480 ms and recorded together with measurement data obtained from the base station. Among the things reported are the measured signal strength of the serving cell and its neighbor cells. A received signal strength indication (RSSI) reading is a value reported by the node's receiver circuitry that represents the power of the node's received packets. In addition, the network measurement report includes identification information as to which node made the report. A series of network measurement reports with the same ID implies that all measurement data of this call group are measured from the same node with a time interval of 480 ms.

Base stations 101-105 may simply transmit the network measurement reports received to MLC 111, or alternatively may report signal-strength information back to MLC 111 where location takes place. Regardless of whether MLC 111 receives the network measurement report or signal strength information, MLC 111 locates the node utilizing its reported received signal strength.

While there are multiple ways for estimating a location from a received signal strength, the technique described in U.S. Pat. No. 6,473,038, METHOD AND APPARATUS FOR LOCATION ESTIMATION is utilized by MLC 111. A translation from RSSI to received power is performed by MLC 111, and a distance to the node is calculated based on the received power of the node and a channel model. More particularly, the RSSI is converted to received power via a RSSI vs. Power transfer curve. The power is then translated to path loss (attenuation) by taking into account the known transmitted power of each device according to:

$$PL_{dB} = Pt_{dBm} - Pr_{dBm}$$

where $Pt_{dBm}$ is the transmitted power and $Pr_{dBm}$ is the received power. After the path loss is computed, a distance is calculated to the node based on the path loss and a channel model.

MLC 111 then finds the mean location of N calculated locations $(x_i, y_i)$ (i=1, 2, ... N) in the range of $\Delta d$ first; and then a weight is applied to each of the calculated locations for re-calculating each of N locations. (location estimates are distributed in a distance range of $\Delta d$ ($\Delta d = S \times \Delta t$, where S is an assumed speed of the node during the time period of $\Delta t$).

Particularly, MLC 111 calculates a mean location $(\bar{x}, \bar{y})$ as:

$$\bar{x} = \frac{1}{N}\sum_{i=1}^{N} x_i \quad \bar{y} = \frac{1}{N}\sum_{i=1}^{N} y_i$$

The mean locations are then re-calculated by MLC 111 to form, $(\hat{x}_i, \hat{y}_i)$ such that:

$$\hat{x}_i = w\bar{x} + (1-w)x_i, \hat{y}_i = w\bar{y} + (1-w)y_i$$

where the weight applied to the call-group is defined as:

$$w = \exp(-n^2/c)$$

where $n = N/N_{max}$ and the parameter $c > 0$ controls the rate of fall-off of the weight function with a call-group size of N. The value of $N_{max}$ depends on the time interval. For the case of time interval of 0.48 s, $N_{max} = 20$ and $c = 0.82$ are suggested for achieving the best accuracy improvement. Finally, values for $(\hat{x}_i, \hat{y}_i)$ are passed to HLR 113 and ultimately to the entity requesting location.

FIG. 2 is a block diagram of the location-finding equipment (MLC 111) of FIG. 1. As shown, MLC 111 comprises logic circuitry 203 (microprocessor 203), receive circuitry 202, and transmit circuitry 201. Logic circuitry 203 preferably comprises a microprocessor controller, such as, but not limited to a Freescale 30 PowerPC microprocessor. In the preferred embodiment of the present invention logic circuitry 203 serves as means for determining the location of any given node from its network measurement reports, and as means for outputting location information to a requesting entity. Additionally receive and transmit circuitry 202203 are common circuitry known in the art for communication utilizing a well known communication protocol, and serve as means for transmitting and receiving messages.

FIG. 3 is a flow chart showing the operation of the location-finding equipment of FIG. 1. The logic flow begins at step 301, where receiver 202 receives signal-strength: information from a particular node. This may comprise receiving a plurality of GSM network measurement reports, or simply receiving RSSI information obtained from the network measurement reports. At step 303 a call group is determined by logic circuitry 203, and for each measurement in a particular call group, a signal-strength measurement is determined. At step 305, a location for the node is calculated from the signal-strength measurements.

As discussed above, determining the location to the node comprises the step of calculating distances from the node to various base stations based on the received power of the node and a channel model. At step 305 logic circuitry 203 averages a plurality of locations to produce an average location $(\bar{x}, \bar{y})$. This is accomplished by finding the mean location of N calculated locations $(x_i, y_i)$ (i=1, 2, ... N) in the range of $\Delta d$. Particularly, logic circuitry 203 produces $(x_i, y_i)$ by applying a weight to each of the calculated locations for re-calculating each of N locations. The mean locations are then re-calculated by logic circuitry 203 to form $(\hat{x}_i, \hat{y}_i)$ such that $\hat{x}_i = w\bar{x} + (1-w)x_i$ and $\hat{y}_i = w\bar{y} + (1-w)y_i$. Finally, at step 307 $(\hat{x}_i, \hat{y}_i)$ for the node is passed to transmitter 201 where it is transmitted to the entity requesting the location.

While the invention has been particularly shown and described with reference to a particular embodiment, it will be understood by those skilled in the art that various changes in form and details may be made therein without departing from the spirit and scope of the invention. For example, although location takes place within MLC 111, one or ordinary skill in the art will recognize that location may take place as described above in any network entity. It is intended that such changes come within the scope of the following claims:

The invention claimed is:

1. A method for determining a location of a node, the method comprising the steps of:
   receiving a plurality of GSM network measurement reports;
   determining a call group from those network measurement reports having a same identification;
   determining signal-strength measurements from the plurality of GSM network measurement reports within the call group;
   determining a location from the signal-strength measurements, wherein the location comprises an (x,y) location:
   averaging a plurality of locations to produce an average location, $(\bar{x}, \bar{y})$ as:

$$\bar{x} = \frac{1}{N}\sum_{i=1}^{N} x_i \quad \bar{y} = \frac{1}{N}\sum_{i=1}^{N} y_i$$

where $x_i$ is a x location calculated from an ith network measurement report, $y_i$ is a y location calculated from the ith network measurement report, and N is a number of network measurement reports within the call group;

calculating $(\hat{x}_i, \hat{y}_i)$ based on weighting the $(\bar{x}, \bar{y})$ location where $$\hat{x}_i = w\bar{x} + (1-w)x_i \text{ and } \hat{y}_i = w\bar{y} + (1-w)y_i, \text{ where}$$

$$w = \exp\left(-\frac{n^2}{c}\right)$$

and where $n = N/N_{max}$ and the parameter $c > 0$ and controls a rate of fall-off of w having a call-group size of N.

2. An apparatus for determining a location of a node, the apparatus comprising:

a receiver receiving a plurality of GSM network measurement reports;

logic circuitry determining a call group from those measurement reports having a same identification, determining signal-strength measurements from the plurality of GSM network measurement reports within the call group, determining a location from the signal-strength measurements, wherein the location comprises an (x,y) location, averaging a plurality of locations to produce an average location, $(\bar{x}, \bar{y})$ as:

$$\bar{x} = \frac{1}{N}\sum_{i=1}^{N} x_i \quad \bar{y} = \frac{1}{N}\sum_{i=1}^{N} y_i$$

$x_i$ is a x location calculated from an ith network measurement report, $y_i$ is a y location calculated from the ith network measurement report, and N is a number of network measurement reports within the call group, and calculating $(\hat{x}_i, \hat{y}_i)$ based on weighting the $(\bar{x}, \bar{y})$ location where $$\hat{x}_i = w\bar{x} + (1-w)x_i \text{ and } \hat{y}_i = w\bar{y} + (1-w)y_i, \text{ where}$$

$$w = \exp\left(-\frac{n^2}{c}\right)$$

and where $n = N/N_{max}$ and the parameter $c > 0$ and controls a rate of fall-off of w having a call-group size of N.

* * * * *